(12) United States Patent
Nordin et al.

(10) Patent No.: US 7,786,181 B2
(45) Date of Patent: Aug. 31, 2010

(54) CHEMICAL COMPOSITION AND PROCESS

(75) Inventors: Jan Nordin, Kvissleby (SE); Ove Nordin, Kvissleby (SE); Lena Jonsson, Bergeforsen (SE)

(73) Assignee: Akzo Nobel N.V., Arnhem (NL)

( * ) Notice: Subject to any disclaimer, the term of this patent is extended or adjusted under 35 U.S.C. 154(b) by 796 days.

(21) Appl. No.: 11/606,189

(22) Filed: Nov. 29, 2006

(65) Prior Publication Data

US 2007/0142485 A1 Jun. 21, 2007

Related U.S. Application Data

(60) Provisional application No. 60/752,614, filed on Dec. 21, 2005.

(51) Int. Cl.
C08J 9/00 (2006.01)
C08J 9/22 (2006.01)
C08J 9/32 (2006.01)

(52) U.S. Cl. .............. 521/55; 264/51; 523/200; 523/202; 523/210

(58) Field of Classification Search ............ 521/54, 521/55; 264/51; 523/200, 202, 210
See application file for complete search history.

(56) References Cited

U.S. PATENT DOCUMENTS

| | | | | |
|---|---|---|---|---|
| 2,661,347 | A | 12/1953 | Wesp et al. | 260/45.85 |
| 3,615,972 | A | 10/1971 | Morehouse, Jr. et al. | 156/79 |
| 3,907,932 | A | 9/1975 | Kennedy et al. | 260/881 |
| 3,945,956 | A | 3/1976 | Garner | 260/2.5 B |
| 3,984,499 | A | 10/1976 | Wardlow, Jr. et al. | 260/880 R |
| 4,117,178 | A | 9/1978 | Pillar | 521/60 |
| 4,361,656 | A | 11/1982 | Mostafa | |
| 5,035,885 | A * | 7/1991 | Arraudeau et al. | 424/501 |
| 5,158,727 | A * | 10/1992 | Coleman-Kammula et al. | 264/109 |
| 5,536,756 | A | 7/1996 | Kida et al. | 521/56 |
| 6,235,394 | B1 | 5/2001 | Shimazawa et al. | 428/402.21 |
| 6,235,800 | B1 | 5/2001 | Kyuno et al. | 521/51 |
| 6,303,108 | B1 * | 10/2001 | Roulier et al. | 424/69 |
| 6,303,215 | B1 * | 10/2001 | Sonobe et al. | 428/295.4 |
| 6,509,384 | B2 | 1/2003 | Kron et al. | 521/56 |
| 6,582,633 | B2 | 6/2003 | Elfving et al. | 264/53 |

FOREIGN PATENT DOCUMENTS

| | | |
|---|---|---|
| EP | 0 348 372 B1 | 12/1989 |
| EP | 0 486 080 B1 | 5/1992 |
| EP | 1 471 105 A2 | 10/2004 |
| EP | 1 471 105 A3 | 10/2004 |
| GB | 976363 | 11/1964 |
| GB | 1007389 | 10/1965 |
| JP | 62-286534 | 12/1987 |
| JP | 2005146030 A * | 6/2005 |
| WO | WO 01/83100 A1 | 9/1999 |
| WO | WO 2004/056549 A1 | 7/2004 |
| WO | WO/2004/072160 A1 | 8/2004 |
| WO | WO/2005/023920 A1 | 3/2005 |
| WO | WO/2006/009643 A2 | 1/2006 |
| WO | WO/2006/009643 A3 | 1/2006 |
| WO | WO 2006/068573 A1 | 6/2006 |
| WO | WO 2006/068574 A1 | 6/2006 |

OTHER PUBLICATIONS

English language translation of Japanese Early-Disclosure No. 87-286534; Early-Disclosure Date Dec. 12, 1987.
Marien, B. A., "Stabilization of High Nitrile Polymers. I. Effect of Dienophilic Compounds," Journal of Polymer Science: Polymer Chemistry Ed., vol. 17 (1979) pp. 425-433.
Gupta, D. C. et al., "Inhibition of Discoloration in Acrylic Polymers," Journal of Applied Polymer Science, vol. 39 (1990) pp. 1821-1826.
Datye, K. V. et al., "Discolouration in Acrylic Fibres," Synthetic Fibres, Jan./Mar. 1984, pp. 6-14.
International Search Report for International Application No. PCT/SE2006/050465 dated May 15, 2007.
Russian Intellectual Property Office Sep. 11, 2009 Office Action for Russian Application No. 2008129676/04(036764) corresponding to the instant application.
English language translation of Russian IPO Sep. 11, 2009 Office Action for Russian Application No. 2008129676/04(036764) corresponding to the instant application.

* cited by examiner

*Primary Examiner*—Irina S Zemel
(74) *Attorney, Agent, or Firm*—Robert C. Morriss

(57) ABSTRACT

The invention relates to a solid powdery composition comprising unexpanded thermally expandable microspheres including a thermoplastic polymer shell encapsulating a propellant and from about 0.1 to about 50 wt % of at least one inhibitor selected from the group consisting of acids having a melting point below about 200° C. and precursors therefore. The invention further relates to preparation and use thereof, a composition comprising a polymeric resin, preparation thereof, a process for working a polymeric resin and a material obtainable thereby.

17 Claims, No Drawings

CHEMICAL COMPOSITION AND PROCESS

The present invention relates to a solid powdery composition comprising microspheres and an inhibitor and a process for the preparation thereof. The invention further relates to use of the composition, a composition comprising a polymeric resin and preparation thereof, a process for working such a composition and objects of material obtainable thereby.

Thermally expandable microspheres including a thermoplastic polymer encapsulating a propellant may be used as a foaming agent when working polymeric materials, for example by extrusion or injection moulding. However, at high processing temperatures and/or long processing times the microspheres may cause discolouration of the material. In some cases there is also a problem of poor form filling, resulting in uneven surfaces of moulded objects.

Also pre-expanded thermoplastic microspheres may be used when working polymeric materials for reducing the density or improving the texture. However, also in this case there may be a problem of discolouration.

U.S. Pat. No. 6,582,633 discloses that discolouration at high temperature moulding can be lowered by using microspheres in which the polymer shell has a high content of nitrile containing monomers.

A great number of substances has been disclosed in the literature for decreasing discolouration of polyacrylonitrile spinning solutions in dimethyl formamide, see for example B. A. Marien, "Stabilisation of High Nitrile Polymers. I. Effect of Dienophilic Compounds", Journal of Polymer Science: Polymer Chemistry Ed., Vol. 17., p. 425-433 (1979); D. C. Gupta et al, "Inhibition of Discoloration in Acrylic Polymers", Journal of Applied Polymer Science, Vol. 39, p. 1821-1826 (1990); and K. V. Datye et al, "Discolouration in Acrylic Fibres, Synthetic Fibres, January/March 1984, p. 6-14.

U.S. Pat. No. 2,661,347 discloses use of maleic acid and maleic anhydride for decreasing discolouration of polymers of acrylonitrile. A preferred practice involves the use of solvents or plasticisers for the acrylonitrile polymers.

U.S. Pat. No. 3,984,499 discloses inclusion of half esters of maleic acid or fumaric acid in nitrile resins.

U.S. Pat. No. 3,907,932 discloses inclusion of an organotin maleate compound in a polymer composition of olefinic nitrile.

EP 1471105 and WO 2005/023920 disclose use of microspheres in combination with a chemical blowing agent that may include citric acid.

It is an object of the invention to provide a microsphere composition that can be used at working polymeric materials at high temperatures with satisfactory results and without causing unacceptable discolouration.

It is another object of the invention to provide a process for working a polymeric resin with expanded or thermally expandable microspheres as an additive.

It is still another object of the invention to provide a composition comprising a polymeric resin that can be used for preparing light weight objects.

It has been found that mixing of certain inhibitors with the microspheres significantly decreases the discolouration when used as foaming agent at working of polymeric materials at high temperature and/or long processing times.

Thus, one aspect of the invention concerns a solid powdery composition comprising expanded or unexpanded thermally expandable microspheres including a thermoplastic polymer shell encapsulating a propellant and from about 0.1 to about 50 wt % of at least one inhibitor selected from the group consisting of acids having a melting point below about 200° C. and precursors therefore, said acid not being citric acid.

Another aspect of the invention concerns a process for the preparation of such a composition comprising mixing expanded or unexpanded thermally expandable microspheres including a thermoplastic polymer shell encapsulating a propellant with from about 0.1 to about 50 wt % of at least one inhibitor selected from the group consisting of acids having a melting point below about 200° C. and precursors therefore, said acid not being citric acid.

Still another aspect of the invention concerns use of such a composition as a foaming agent in working of polymeric resins.

Still another aspect of the invention concerns a composition comprising a polymeric resin, expanded or thermally expandable microspheres including a thermoplastic polymer shell encapsulating a propellant, and from about 0.1 to about 50 wt %, based on the amount of the expandable microspheres, of at least one inhibitor selected from the group consisting of acids having a melting point below about 200° C. and precursors therefore, said acid not being citric acid.

Still another aspect of the invention concerns a process for the preparation of a composition comprising mixing mixing a polymeric resin with expanded or unexpanded thermally expandable microspheres including a thermoplastic polymer shell encapsulating a propellant and with from about 0.1 to about 50 wt % of at least one inhibitor selected from the group consisting of acids having a melting point below about 200° C. and precursors therefore, said acid not being citric acid.

A further aspect of the invention concerns a process for working a polymeric resin composition as described above, i.e. a composition comprising a polymeric resin and, admixed therein, expanded or unexpanded thermally expandable microspheres including a thermoplastic polymer shell encapsulating a propellant and from about 0.1 to about 50 wt %, based on the amount of the microspheres, of at least one inhibitor selected from the group consisting of acids having a melting point below about 200° C. and precursors therefore, said acid not being citric acid.

Still a further aspect of the invention concerns objects of optionally foamed polymeric materials obtainable by a process of working a resin as described above comprising a step of expanding the expandable microspheres.

Thermally expandable microspheres are known in the art and described in detail in, for example, U.S. Pat. Nos. 3,615,972, 3,945,956, 5536756, 6,235,800, 6,235,394 and 6,509,384, in EP 486080, in JP laid open patent application, Laid Open No. 87-286534, and in WO 2004/072160. In such microspheres, the propellant is normally a liquid having a boiling temperature not higher than the softening temperature of the thermoplastic polymer shell. Upon heating, the propellant evaporates to increase the internal pressure at the same time as the shell softens, resulting in significant expansion of the microspheres, normally from about 2 to about 5 times their diameter. The temperature at which the expansion starts is called $T_{start}$, while the temperature at which maximum expansion is reached is called $T_{max}$. When $T_{max}$ is exceeded the propellant has been released through the polymer shell to such an extent that the microspheres start to collapse.

Expanded microspheres, sometimes referred to as pre-expanded thermoplastic microspheres, can be obtained by expanding expandable microspheres as described herein, for example to a particle diameter from 2 to 5 times larger than the diameter of the unexpanded microspheres. The density of the expanded microspheres may, for example, be from 0.005 to 0.06 g/cm³. The expansion is effected by heating the expandable microspheres to a temperature above $T_{start}$. The density of the expanded microspheres can be controlled by selecting temperature and time for the heating. The expansion can be effected by any suitable means for heating in any suitable device, as described in e.g. EP 0348372, WO 2004/056549 or WO 2006/009643.

According to the invention the microspheres may be expanded, expandable or a mixture of expanded and expandable microspheres.

The microspheres preferably have a polymer shell made from homo- or co-polymers obtained by polymerising ethylenically unsaturated monomers. Those monomers can, for example, be nitrile containing monomers such as acrylonitrile, methacrylonitrile, α-chloroacrylonitrile, α-ethoxyacrylonitrile, fumaronitrile or crotonitrile; acrylic esters such as methyl acrylate or ethyl acrylate; methacrylic esters such as methyl methacrylate, isobornyl methacrylate, ethyl methacrylate or hydroxyethylmethacrylate; vinyl halides such as vinyl chloride; vinylidene halides such as vinylidene chloride; vinyl pyridine; vinyl esters such as vinyl acetate; styrenes such as styrene, halogenated styrenes or α-methyl styrene; dienes such as butadiene, isoprene and chloroprene; unsaturated carboxylic compounds like acrylic acid, methacrylic acid and salts thereof; or other unsaturated monomers like acrylamide or N-substituted maleimides. Any mixtures of the above mentioned monomers may also be used.

The present invention is particularly advantageous if the monomers for the thermoplastic polymer shell of the expandable microspheres comprise nitrile containing monomers, preferably in a high amount, for example from about 40 to 100 wt %, preferably from about 60 to 100 wt % of the monomers polymerised to the polymer shell. The amount of nitrile containing monomers may also be from about 80 to 100 wt %, most preferably from about 90 to 100 wt %, particularly from about 95 to 100 wt % of the monomers polymerised to the polymer shell.

The nitrile containing monomers used for the polymer shell are preferably mainly selected from one or more of acrylonitrile and methacrylonitrile. If other ethylenically unsaturated monomers are present, they are preferably selected from one or more of acrylic esters or methacrylic esters. It is also most preferred to only use non-halogen containing monomers.

The softening temperature of the polymer shell, normally corresponding to its glass transition temperature ($T_g$), is preferably within the range from about 80 to about 200° C., most preferably from about 115 to about 200° C.

It may sometimes be desirable that the monomers for the polymer shell also comprise crosslinking multifunctional monomers, such as one or more of divinyl benzene, ethylene glycol di(meth)acrylate, di(ethylene glycol) di(meth)acrylate, triethylene glycol di(meth)acrylate, propylene glycol di(meth)acrylate, 1,4-butanediol di(meth)acrylate, 1,6-hexanediol di(meth)acrylate, glycerol di(meth)acrylate, 1,3-butanediol di(meth)acrylate, neopentyl glycol di(meth)acrylate, 1,10-decanediol di(meth)acrylate, pentaerythritol tri(meth) acrylate, pentaerythritol tetra(meth)acrylate, triallylformal tri (meth)acrylate, allyl methacrylate, trimethylol propane tri (meth)acrylate, tributanediol di(meth)acrylate, PEG #200 di(meth)acrylate, PEG #400 di(meth)acrylate, PEG #600 di(meth)acrylate, 3-acryloyloxyglycol monoacrylate, triacryl formal, triallyl isocyanate, triallyl isocyanurate etc.

Preferably the polymer shell constitutes from about 60 to about 95 wt %, most preferably from about 70 to about 85 wt % of the total microsphere. If present, crosslinking multifunctional monomers preferably constitute from about 0.1 to about 10 wt %, most preferably from about 0.1 to about 1 wt %, particularly most preferably from about 0.2 to about 0.5 wt % of the total amounts of monomers for the polymer shell.

The propellant is normally a liquid having a boiling temperature not higher than the softening temperature of the thermoplastic polymer shell and may comprise hydrocarbons such as n-pentane, isopentane, neopentane, cyclopentane, cyclohexane, butane, isobutane, hexane, isohexane, neohexane, heptane, isoheptane, octane, isooctane, isodecane, isododecane, or mixtures thereof. Aside from them, other hydrocarbon types can also be used, such as petroleum ether, or chlorinated or fluorinated hydrocarbons, such as methyl chloride, methylene chloride, dichloroethane, dichloroethylene, trichloroethane, trichloroethylene, trichlorofluoromethane, perfluorinated hydrocarbons, etc. The boiling point at atmospheric pressure may be within a wide range, preferably from about −20 to about 200° C., most preferably from about −20 to about 150° C. It is particularly preferred that the propellant has a boiling point or boiling point range so a temperature above 50° C., more preferably above 60° C., most preferably above 70° C., but preferably not higher than about 150° C., would be required to evaporate at least 50 wt %, preferably at least 80 wt % of the propellant at atmospheric pressure. The propellant suitably makes up from about 5 to about 40 wt % of the microsphere.

In an embodiment the propellant preferably comprises isooctane, suitably in an amount of more than 50 wt %, preferably more than 55 wt %, more preferably more than about 60 wt % most preferably more than about 70 wt %, or possibly even substantially consists of isooctane. The propellant may further comprise, preferably up to totally 50 wt %, of one or more of butanes, pentanes, hexanes, heptanes, petroleum distillates or other liquids giving a suitable boiling point range of the propellant. Particularly preferred hydrocarbons for use in combination with isooctane are isobutane, isopentane, n-pentane, n-hexane, petroleum ether and n-heptane.

Suitably the propellant is liquid at room temperature and has a boiling point at atmospheric pressure below the softening point of the polymer shell. Preferably the propellant constitutes from about 10 to about 30 wt %, most preferably from about 15 to about 25 wt % of the total microsphere.

Apart from the polymer shell and the propellant the microspheres may comprise further substances added during the production thereof, normally in an amount from about 1 to about 20 wt %, preferably from about 2 to about 10 wt %. Examples of such substances are solid suspending agents, such as one or more of silica, chalk, bentonite, starch, crosslinked polymers, methyl cellulose, gum agar, hydroxypropyl methylcellulose, carboxy methylcellulose, colloidal clays, and/or one or more salts, oxides or hydroxides of metals like Al, Ca, Mg, Ba, Fe, Zn, Ni and Mn, for example one or more of calcium phosphate, calcium carbonate, magnesium hydroxide, barium sulphate, calcium oxalate, and hydroxides of aluminium, iron, zinc, nickel or manganese. If present, these solid suspending agents are normally mainly located to the outer surface of the polymer shell. However, even if a suspending agent has been added during the production of the microspheres, this may have been washed off at a later stage and could thus be substantially absent from the final product.

Preferably the microspheres of the composition have a comparatively high $T_{start}$ and $T_{max}$. $T_{start}$ is preferably within the range from about 80 to about 200° C., more preferably from about 130 to about 190° C., most preferably from about 150 to about 180° C., while $T_{max}$ preferably is higher than about 190° C., most preferably higher than about 200° C. Normally $T_{max}$ does not exceed about 300° C.

The average particle size of the expandable microspheres is suitably from about 1 to about 500 μm, preferably from about 3 to about 200 μm, most preferably from about 5 to about 100 μm. By heating to a temperature above $T_{start}$, it is normally possible to expand the microspheres from about 2 to about 7 times, preferably from about 4 to about 7 times, their diameter.

Expandable microspheres as described above are commercially available under the trademark Expancel® DU and may be produced by methods known in the art, for example as disclosed in the earlier mentioned U.S. Pat. Nos. 3,615,972, 3,945,956, 5,536,756, 6,235,800, 6,235,394 and 6509384, in EP 486080, in JP laid open patent application, Laid Open No. 87-286534, and in WO2004/072160. Also expanded microspheres are commercially available, for example under the trademark Expancel® DE.

The at least one inhibitor in the compositions of the invention is preferably an acid or a precursor therefore, i.e. a substance decomposing or in another way reacting to form at least one acid at the conditions prevailing during working of the polymeric resin. Such precursors include, for example, anhydrides of the acids. The acid may also be in its hydrated from. The melting point of the acid or its hydrate is below about 200° C., preferably below about 150° C. There is no critical lower limit and the inhibitors may, for example, have a melting point of at least about 0° C. or at least about 30° C.

The acid is preferably an organic acid preferably containing at least one carboxylic group in its solid form.

A group of acids useful as inhibitors include formic acid, benzoic acid, oxalic acid, azelaic acid, malonic acid, malic acid, succinic acid, maleic acid, phthalic acid, acrylic acid, methacrylic acid, mixtures thereof and precursors therefore, such as anhydrides. Particularly preferred inhibitors include azelaic acid, maleic acid, maleic acid anhydride, phthalic acid, phthalic acid anhydride, oxalic acid, succinic acid, succinic acid anhydride and mixtures thereof.

In an embodiment of the invention the composition comprises a mixture of two or more inhibitors as described above or a combination of one inhibitor as described above with another compound, such as citric acid, a precursor therefore or any other compound useful as chemical blowing agent. Useful combinations include maleic acid or a precursor therefore, e.g. maleic anhydride, with one or more of oxalic acid or azelaic acid, or precursors therefore. Further, the at least one inhibitor may, for example, also be a mixture comprising maleic acid and citric acid, or one or more precursor for at least one of them.

The amount of inhibitor in the composition is preferably from about 0.1 to about 20 wt %, most preferably from about 0.5 to about 15 wt %, particularly most preferably from about 1 to about 10 wt %, based on the amount of the expandable microspheres.

A composition of the invention may be prepared by any practical method, for example by dry mixing expanded or expandable microspheres with an inhibitor or by mixing the microspheres with a solution of the inhibitor. It is also possible to mix the microspheres with a salt of the inhibitor and at a later stage acidify the salt to obtain the corresponding acid. If the microspheres comprise on the surface thereof alkaline substances such as hydroxides of metals, it may in some cases be appropriate to fully or partly remove such substances before mixing with the inhibitor.

A composition comprising expanded or expandable microspheres and at least one inhibitor as described above is useful as a foaming agent at working of various kinds of polymeric thermoplastic and thermosetting resins, for example by mixing with the polymeric resin to provide a composition comprising a polymeric resin, expandable microspheres and at least one inhibitor. However, such a composition comprising a polymeric resin may also be prepared by adding the components separately, wherein the preferred relative amounts of microspheres and inhibitor is as described above.

Examples of polymeric resins include polyolefines, TPE (thermoplastic elastomers), thermoplastic polyesters, polycarbonates, polyamides, acetals, styrenic based polymers and PVC and copolymers thereof. Examples of polyolefines include polypropene, polyethene and copolymers thereof. Examples of thermoplastic elastomers include styrene block copolymers like SBS (styrene butadiene styrene) and SEBS (styrene ethylene butadiene styrene), olefinic thermoplastic/rubber blends like TPO (thermoplastic polyolefins) and TPE-O (thermoplastic elastomer olefinic), thermoplastic polyurethanes block copolymers, TPU (thermoplastic urethanes) and TPE-U (thermoplastic elastomer urethane), thermoplastic ether/ester copolymers like TEEE (thermoplastic elastomer ether ester block copolymer), and copolyamides like TPE-A (thermoplastic elastomer amide) and COPA (copolyamide). Examples of thermoplastic polyesters include PET (polyethylene terephtalate) and PBT (polybutadien terephtalate). Examples of polyamides include PA 6, PA 66, PA 11 and PA 12. Examples of acetals include POM (polyoximethylene). Examples of styrenic based polymers include PS (polystyrene), ABS (acrylonitrile butadiene styrene) and SAN (styrene acrylonitrile).

The invention has been found advantageous for working polymeric resins of high melting temperature, for example of at least 100° C. or at least 180° C. Such polymeric resins include polypropylene, polystyrene, HD polyethylene and copolymers thereof, preferably comprising at least 50 mole %, most preferred at least 80 mole % of monomers of any of propylene, styrene or ethylene.

When working polymeric resin compositions comprising expanded or expandable microspheres and at least one inhibitor, any conventional method and machine can be used alone or in combination and may, for example, include one or more of calendering, extrusion, blow and injection moulding. The working is carried out at elevated temperature, preferably at least about 100° C., most preferably at least about 180° C., for example from about 180 to about 300° C. or from about 210 to about 250° C. If expandable microspheres are used, they will cause foaming of the polymeric resin during the working.

Expanded or expandable microspheres and at least one inhibitor as described above may be added to and mixed with the resin at any time, either as a pre-prepared composition as described above or separately. For example, the microspheres and the inhibitor may be added directly to and mixed with a powder or granules of the resin before or after they have been charged to the machine. If mixed before being charged to the machine, it is possible to provide a simple mixture or a compound prepared by granulating the components together optionally without causing the microspheres to expand, e.g. by extrusion at a temperature below the expansion temperature at the prevailing pressure, and optionally together with other additives desirable for the final working.

The amount of polymeric resin in the composition is preferably from about 70 to about 99.5 wt %, most preferably from about 80 to about 90 wt %. The amount of expandable microspheres is preferably from about 0.5 to about 20 wt %, most preferably from about 1 to about 10 wt %. The amount of inhibitor is preferably as described above.

It is also possible to add the microspheres included in a masterbatch of a resin with lower melting point, such as low melting polyolefines and copolymers thereof, for example EVA (ethyl-vinyl acetate), EBA (ethyl-buthyl acrylate), EMA (ethyl-methyl acrylate), ethylene-octene copolymer or low melting polyethylene. The masterbatch may also comprise an inhibitor as described above, otherwise the inhibitor is preferably added to the resin separately. If a masterbatch is used, the content of microspheres therein is preferably from about 10 to about 90 wt %, most preferably from about 20 to about 75 wt %.

When operating the machine, heat is applied to achieve a temperature sufficient for the resin to melt, for example at least about 100° C. or at least about 180° C. Then the actual moulding or calendering takes place, i.e. the melted resin is forced by any suitable means such as a moulding screw through a series of calender rollers or an extrusion die, or is injected into a mould. In calendering with expandable microspheres, the main part of the expansion takes place between the rollers, while in extrusion or moulding with expandable microspheres, the expansion mainly occurs when the pressure is released after passing the dye or within the mould, even if the temperature there is significantly lower. Thus, the main part of the expansion of the microspheres takes place after passing the moulding screw, where fully expanded microspheres otherwise could have been destroyed by the strong shear forces.

The process of the invention has been found to be particularly advantageous for preparation of light weight objects through injection moulding. It has also been found that high quality objects can be obtained from polypropylene and other high melting polymers and/or when the polymer is maintained at elevated temperature, optionally at a melted state, for a long period of time, for example from about 3 min to about 5 hrs or from about 5 min to about 2 hrs. Expanded microspheres that do not themselves cause any significant foaming are particularly advantageous for thermosetting resins having short curing times, such as polyurethane, phenolic or epoxy resins.

The invention will be further described in connection with the following Examples which, however, are not intended to limit the scope thereof. Unless otherwise stated, all parts and percentages refer to parts and percent by weight.

EXAMPLE 1

Expandable MS (microspheres) of the type Expancel® 980 DU 120 were dry-mixed with different amounts of inhibitors. 2 wt % of this mixture was subsequently mixed with PP (polypropene) beads from Borealis (BF330 MO MFR 18 g/10 min 230° C., 2.16 kg). The mix of PP, MS and stabiliser was moulded in a Demag Ergotech injection moulding machine with 50 tons clamping force and a 40 mm screw, to form 100×50 mm plates of 5 mm thickness. The injection speed was 140 ccm/sec, the set temperature from hopper to nose was 190-200-220-230° C., the mould temperature was 15° C. and the cooling time was 90 sec. The brightness of the moulded PP plates was measured using a Minolta Spectrophotometer CM 3610 d. The results appear in the table below:

| Inhibitor | wt % inhibitor of MS | Brightness (%) | Comments |
|---|---|---|---|
| No addition (ref.) | 0 | 15 | |
| Oxalic acid di-hydrate | 5 | 36 | Improved form filling |
| Azelaic acid | 5 | 30 | Improved form filling |
| Sodium formaldehyde sulfoxylate | 5 | 23 | |
| Oxalic acid di-hydrate | 0.5 | 24 | |

EXAMPLE 2

Mixtures of Expancel 980 DU 120 and 5 wt % inhibitor were tested as in Example 1. The results appear in the table below:

| Inhibitor | wt % inhibitor of MS | Brightness (%) | Comment |
|---|---|---|---|
| No addition (ref.) | 0 | 16 | |
| No addition (ref.) | 0 | 14 | |
| Maleic acid + citric acid mono-hydrate | 3 + 2 | 55 | Improved form filling |

EXAMPLE 3

Mixtures of Expancel 980 DU 120 and 5 wt % inhibitor were tested as in Example 1 with the exception for the set temperature from hopper to nose was 190-200-210-230° C. The results appear in the table below:

| Inhibitor | wt % inhibitor of MS | Brightness (%) | Comment |
|---|---|---|---|
| No addition (ref.) | 0 | 21 | |
| Benzoic acid | 5 | 32 | |
| Maleic acid anhydride | 5 | 56 | |
| Maleic acid | 5 | 62 | |
| No addition (ref.) | 0 | 22 | |

EXAMPLE 4

Mixtures of Expancel 980 DU 120 and 1 wt % inhibitor were tested as in Example 3 with the exception that the cooling time was 60 sec. The results appear in the table below:

| Inhibitor | wt % inhibitor of MS | Brightness (%) | Comment |
|---|---|---|---|
| No addition (ref.) | 0 | 34 | |
| Maleic acid | 1 | 56 | |
| Malonic acid | 1 | 48 | |
| Acrylic acid | 1 | 43 | |
| Succinic acid | 1 | 52 | |
| No addition (ref.) | 0 | 32 | |
| Maleic acid | 1 | 55 | |
| Phthalic acid anhydride | 1 | 54 | |

EXAMPLE 5

Mixtures of Expancel 980 DU 120 and various amounts of inhibitors were tested as in Example 1 with the exception for the set temperature from hopper to nose was 190-200-210-230° C. The results appear in the table below:

| Inhibitor | wt % inhibitor of MS | Brightness (%) | Comment |
|---|---|---|---|
| No addition (ref.) | 0 | 26 | |
| Maleic acid | 0.5 | 40 | |

-continued

| Inhibitor | wt % inhibitor of MS | Brightness (%) | Comment |
|---|---|---|---|
| Maleic acid | 1 | 49 | |
| Maleic acid | 2 | 57 | |
| Maleic acid | 3 | 61 | |
| Maleic acid | 4 | 62 | |
| Maleic acid | 5 | 62 | |
| Citric acid mono-hydrate | 1 | 41 | |
| Citric acid mono-hydrate | 3 | 47 | Improved form filling |
| Citric acid mono-hydrate | 5 | 46 | Improved form filling |

The Examples show that the inclusion of an inhibitor according to the invention improves the brightness of the moulded object and in some cases also the form-filling. However, it should be noted that although the results in each run were found to be reproducible, the absolute values of brightness in the different Examples (i.e. different runs) are not fully comparable due to different temperature profiles and/or different cooling times in the machine.

The invention claimed is:

1. Solid powdery composition comprising expanded or unexpanded thermally expandable microspheres including a thermoplastic polymer shell encapsulating a propellant and from about 0.1 to about 50 wt % of at least one inhibitor selected from the group consisting of formic acid, benzoic acid, oxalic acid, azelaic acid, malonic acid, malic acid, succinic acid, maleic acid, phthalic acid, acrylic acid, methacrylic acid, mixtures thereof and precursors therefore.

2. Composition as claimed in claim 1, wherein the polymer shell of the microspheres is made from homo- or co-polymers obtained by polymerising ethylenically unsaturated monomers.

3. Composition as claimed in claim 2, wherein the ethylenically unsaturated monomers comprise nitrile containing monomers.

4. Composition as claimed in claim 1, wherein the at least one inhibitor is selected from the group consisting of maleic acid, maleic acid anhydride, phthalic acid, phthalic acid anhydride, oxalic acid, succinic acid, succinic acid anhydride and mixtures thereof.

5. Composition as claimed in claim 4, wherein the at least one inhibitor comprises maleic or a precursor therefore.

6. Composition comprising a polymeric resin, expanded or thermally expandable microspheres including a thermoplastic polymer shell encapsulating a propellant, and from about 0.1 to about 50 wt %, based on the amount of the microspheres, of at least one inhibitor selected from the group consisting formic acid, benzoic acid, oxalic acid, azelaic acid, malonic acid, malic acid, succinic acid, maleic acid, phthalic acid, acrylic acid, methacrylic acid, mixtures thereof.

7. Composition as claimed in claim 6, wherein the polymer shell of the microspheres is made from homo- or co-polymers obtained by polymerising ethylenically unsaturated monomers.

8. Composition as claimed in claim 7, wherein the ethylenically unsaturated monomers comprise nitrile containing monomers.

9. Composition as claimed in claim 6, wherein the at least one inhibitor is selected from the group consisting of maleic acid, maleic acid anhydride, phthalic acid, phthalic acid anhydride, oxalic acid, succinic acid, succinic acid anhydride and mixtures thereof.

10. Composition as claimed in claim 9, wherein the at least one inhibitor comprises maleic acid or a precursor therefore.

11. Composition as claimed in claim 6, wherein the composition comprising a polymeric resin comprises 0.5 to about 20 wt % of the microspheres.

12. A process for the preparation of a composition according to claim 1 comprising mixing unexpanded thermally expandable microspheres including a thermoplastic polymer shell encapsulating a propellant with from about 0.1 to about 50 wt % of at least one inhibitor selected from the group consisting of formic acid, benzoic acid, oxalic acid, azelaic acid, malonic acid, malic acid, succinic acid, maleic acid, phthalic acid, acrylic acid, methacrylic acid, mixtures thereof and precursors therefore.

13. A process for the preparation of a composition according to claim 6 comprising mixing a polymeric resin with expanded or unexpanded thermally expandable microspheres including a thermoplastic polymer shell encapsulating a propellant and with from about 0.1 to about 50 wt % of at least one inhibitor selected from the group consisting of formic acid, benzoic acid, oxalic acid, azelaic acid, malonic acid, malic acid, succinic acid, maleic acid, phthalic acid, acrylic acid, methacrylic acid, mixtures thereof and precursors therefore.

14. A process for working a polymeric resin in a composition comprising a polymeric resin, expanded or thermally expandable microspheres including a thermoplastic polymer shell encapsulating a propellant, and from about 0.1 to about 50 wt %, based on the amount of the microspheres, of at least one inhibitor selected from the group consisting of formic acid, benzoic acid, oxalic acid, azelaic acid, malonic acid, malic acid, succinic acid, maleic acid, phthalic acid, acrylic acid, methacrylic acid, mixtures thereof and precursors therefore, said process comprising a step of heating the resin and forming it to a desired shape.

15. A process as claimed in claim 14, wherein the working is carried out at a temperature of at least about 100° C.

16. A process as claimed in claim 15, wherein the working is carried out at a temperature of at least about 180° C.

17. A process as claimed in claim 14, wherein the working include one or more of calendering, extrusion, blow and injection moulding.

* * * * *